US012737644B2

(12) United States Patent
Seibel et al.

(10) Patent No.: US 12,737,644 B2
(45) Date of Patent: Sep. 15, 2026

(54) CONTINUOUS LEARNING OF DIGITAL ASSISTANTS

(71) Applicant: SAP SE, Walldorf (DE)

(72) Inventors: Julian Seibel, Annweiler am Trifels (DE); Steffen Terheiden, Mannheim (DE)

(73) Assignee: SAP SE, Walldorf (DE)

( * ) Notice: Subject to any disclaimer, the term of this patent is extended or adjusted under 35 U.S.C. 154(b) by 704 days.

(21) Appl. No.: 17/978,720

(22) Filed: Nov. 1, 2022

(65) Prior Publication Data

US 2024/0144039 A1 May 2, 2024

(51) Int. Cl.

| | |
|---|---|
| ***G06N 5/022*** | (2023.01) |
| ***G10L 15/06*** | (2013.01) |
| ***G10L 15/22*** | (2006.01) |

(52) U.S. Cl.

CPC ............ *G06N 5/022* (2013.01); *G10L 15/063* (2013.01); *G10L 15/22* (2013.01); *G10L 2015/0636* (2013.01)

(58) Field of Classification Search

CPC .... G06F 16/33295; G06F 40/30; G06F 40/35; G06F 40/279; G10L 2015/0636; G10L 15/22; G10L 15/063; G06N 5/022

See application file for complete search history.

(56) References Cited

U.S. PATENT DOCUMENTS

| | | | | |
|---|---|---|---|---|
| 5,497,319 A * | 3/1996 | Chong | G06F 40/151 | 707/999.001 |
| 6,785,869 B1 * | 8/2004 | Berstis | G06F 40/169 | 715/209 |
| 8,744,995 B1 * | 6/2014 | Hewinson | G06F 16/313 | 707/603 |
| 2003/0125929 A1 * | 7/2003 | Bergstraesser | G06F 40/289 | 707/E17.071 |
| 2004/0123234 A1 * | 6/2004 | Anderson | G06F 16/289 | 715/234 |
| 2010/0114887 A1 * | 5/2010 | Conway | G06F 3/0237 | 707/E17.014 |
| 2012/0150848 A1 * | 6/2012 | O'Neill | G06F 16/24578 | 707/723 |

(Continued)

OTHER PUBLICATIONS

Arjovski, M. et al., "Wasserstein GAN," downloaded from the Internet at https://arxiv.org/pdf/1701.07875.pdf, 32 pages, Dec. 6, 2017.

(Continued)

*Primary Examiner* — Marc S Somers

(74) *Attorney, Agent, or Firm* — Sterne, Kessler, Goldstein & Fox P.L.L.C.

(57) ABSTRACT

Various embodiments for a continuous learning system are described herein. An embodiment operates by receiving a query from a user and identifying an unknown phrase in the query. User feedback regarding the unknown phrase is requested and received. A first pre-existing entity of a plurality of pre-existing entities that corresponds to the received user feedback is identified. A relationship between the first pre-existing entity and the unknown is added to the knowledgebase. The query is executed against the knowledgebase using the first pre-existing entity. A response, to the executed query, is provided to the user.

20 Claims, 5 Drawing Sheets

(56) References Cited

U.S. PATENT DOCUMENTS

| | | | | |
|---|---|---|---|---|
| 2013/0304758 | A1* | 11/2013 | Gruber | G06F 16/9535<br>707/769 |
| 2014/0143665 | A1* | 5/2014 | Hauser | G06F 40/30<br>715/259 |
| 2018/0081871 | A1* | 3/2018 | Williams | G06F 16/31 |
| 2020/0394269 | A1* | 12/2020 | Seibel | G06F 40/284 |
| 2021/0279243 | A1* | 9/2021 | Sen | G06F 16/24573 |
| 2022/0300831 | A1* | 9/2022 | Friede | G06N 5/022 |

OTHER PUBLICATIONS

Devlin, J. et al., "BERT: Pre-training of Deep Bidirectional Transformers for Language Understanding," downloaded from the Internet at https://arxiv.org/pdf/1810.04805.pdf, 16 pages, May 24, 2019.

Goodfellow, I.J. et al., "Generative Adversarial Nets," downloaded from the Internet at https://proceedings.neurips.cc/paper/2014/file/5ca3e9b122f61f8f06494c97b1afcef3-Paper.pdf, 9 pages, 2014.

Lecun, Y. et al., "Object Recognition with Gradient-Based Learning," downloaded from the Internet at http://yann.lecun.com/exdb/published/pd/lecun-99.pdf, 28 pages, 1999.

Mirza, M. et al., "Conditional Generative Adversarial Nets," downloaded from the Internet at https://arxiv.org/pdf/1411.1784.pdf, 7 pages, Nov. 6, 2014.

Nguyen, D.Q. et al., "A Novel Embedding Model for Knowledge Base Completion Based on Convolutional Neural Network," downloaded from the Internet at https://arxiv.org/pdf/1712.02121.pdf, 7 pages, Mar. 13, 2018.

Reimers, N. et al., "Sentence-BERT: Sentence Embeddings using Siamese BERT-Networks," downloaded from the Internet at https://arxiv.org/pdf/1908.10084.pdf, 11 pages, Aug. 27, 2019.

Trouillon, T. et al., "Knowledge Graph Completion via Complex Tensor Factorization," downloaded from the Internet at https:/arxiv.org/pdf/1702.06879.pdf, 38 pages, Nov. 26, 2017.

* cited by examiner

CONTINUOUS LEARNING OF DIGITAL ASSISTANTS

BACKGROUND

Digital assistants, such as chatbots, face a number of problems that limit their usefulness in supporting users in their day-to-day operations and tasks, such as understanding the terminology users may use in submitting requests. One problem is that the digital assistant often relies on a static database or set of enumerated sources of data to answer the questions asked by users or perform actions on behalf of different users. However, different users may use terminology that is not stored or not accurate in the presently accessible database or data sources thus rendering the digital assistant incapable of assisting the user.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Digital assistants, such as chatbots, face a number of problems that limit their usefulness in supporting users in their day-to-day operations and tasks, such as understanding the terminology users may use in submitting requests. One problem is that the digital assistant often relies on a static database or set of enumerated sources of data to answer the questions asked by users or perform actions on behalf of different users. However, different users may use terminology that is not stored or not accurate in the presently accessible database or data sources thus rendering the digital assistant incapable of assisting the user.

Figure 1:
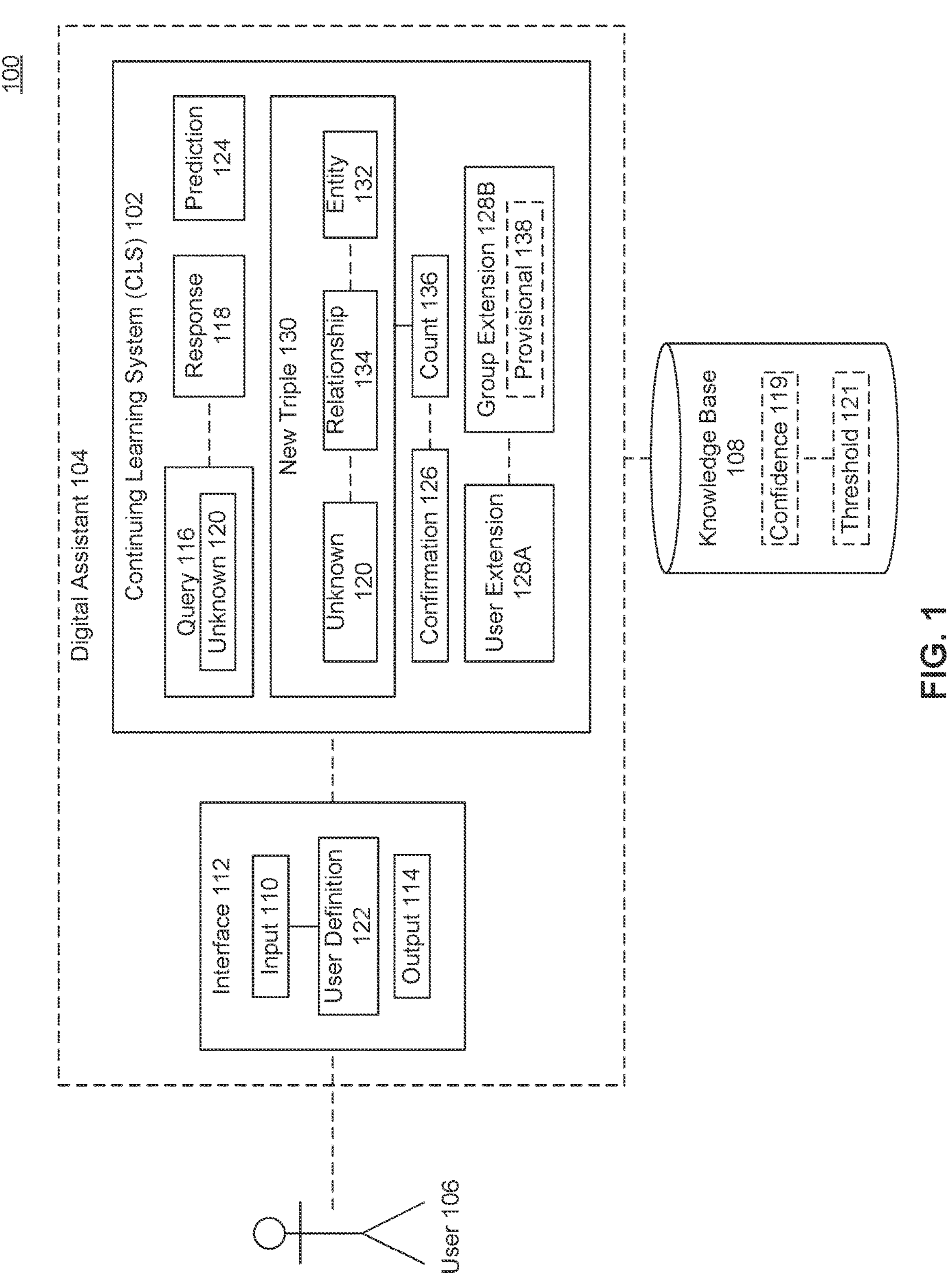
FIG. 1 illustrates a block diagram 100 illustrating a continuous learning system (CLS), according to some example embodiments.

FIG. 1 illustrates a block diagram 100 illustrating a continuous learning system (CLS) 102, according to some example embodiments. In some embodiments, CLS 102 may enable a bot or digital assistant 104 to learn the terminology of and customize responses for a particular user 106 (or group of users) and extend an existing knowledgebase 108 based on user input 110 or feedback. This continuous learning of the digital assistant 104 provides for more efficient, faster, and streamlined processing, more effective responses, quicker response times, greater user satisfaction, and an expanded knowledgebase 108.

Digital assistant 104 may include any computing device, or network of computing devices, that is configured to respond to input 110 received from user 106 via an interface 112. Interface 112 may include a visual interface (e.g., capable of displaying text, images, webpages, videos, etc.), an audio interface (e.g., that receives and responds to audio commands), a tactile interface, or any other interface allowing for input 110 to be received from user 106 and output 114 provided or communicated to user 106.

In some embodiments, digital assistant 104 may include a bot that a user may chat with over a website or app, an automated response system that a user may call into to interact with, a standalone device such as AMAZON ALEXA or GOOGLE HOME, or a system integrated into another device such as APPLE SIRI in a mobile phone.

Digital assistant 104 may receive input 110 via interface 112. As noted above, input 110 may be textual or voice/audible input provided by user 106. The input 110 may be received by CLS 102 and output 114 may be provided back to user 106 via interface 112. In some embodiments, output 114 may be the same format as the input 110 (e.g., audible input 110 may result in audible output 114), while in other embodiments, the formats may vary (e.g., audible input 110 may result in something being visually shown via interface 112 or another connected device such as a monitor or television).

In some embodiments, the input 110 may be a query 116. Query 116 may be a request for information or a request to perform a command. Example commands may include turning on/off a light, changing the channel, playing a particular song or video, or performing a transaction. Or query 116 may be a request for information to which CLS 102 may identify or generate an answer or response 118, based on knowledgebase 108.

In some embodiments, the response 118 may be provided as output 114 to user 106 via interface 112. In some embodiments, particularly of query 116 being a command, response 118 may include performing the command with no further output, or performing the command and providing visual or auditory confirmation that the command was performed or could not be performed. For example, the digital assistant 104 may cause a requested light to be turned off, or the television volume to be lowered.

Knowledgebase 108 may include a set of data from a database, a set of computers, and/or even the Internet. In some embodiments, the data of knowledgebase 108 may be organized into a knowledge graph. The knowledge graph may include data from one or more data sources that is organized in a manner allows digital assistant 108 or CLS 102 to more quickly process and respond to a query 116.

In some embodiments, the knowledge graph may include a connection between different entities, and may be organized (at least in part as a set of triples). For example, the knowledge graph may include connections such as: Paris city in France, France country in Europe, or Obama president of United States. Organizing data into a knowledge graph may help generate faster responses 118 to different queries 116 that may be received and may need to be processed by CLS 102. The terms knowledgebase 108 and knowledge graph may be used interchangeably herein.

In some embodiments, when a query 116 is executed against knowledgebase 108, CLS 102 may generate or receive a confidence score 119 from knowledgebase 108. Confidence 119 may indicate a level of certainty that a particular queried word or phrase (from query 116) was properly identified or understood based on the information available from knowledgebase 108. In some embodiments, confidence 119 may indicate a confidence in the response 118 which may be reduced or affected if a particular word or phrase was not understood, ambiguous, has multiple definitions or no clear definition. In some embodiments, typos, misspelling, mistakes, or unfamiliar lexicon, acronyms, or abbreviations can reduce the confidence score 119. For example, the confidence score 119 for "Paris" may be higher than the confidence score 119 for "Parix".

In some embodiments, CLS 102 may detect that there are one or more unfamiliar, ambiguous, or unknown 120 words or phrases in the user input 110 or query 116. Unknown 120 may be any word, phrase, image, or symbol which does not exist in knowledgebase 108 or cannot be identified in knowledgebase 108 with a threshold 121 level of certainty. In some embodiments, unknown 120 may have a confidence score 119 that is below a particular threshold 121, or that causes the confidence 119 in response 118 to be below threshold 121.

If CLS 102 determines that there are one or more unknowns 120 in query 116, then CLS 102 may request clarification or feedback from the user 106. In some embodiments, CLS 102 may generate a prediction 124 and ask the user 106, via the interface 112 whether or not the prediction 124 is correct. The prediction 124 may be the response 118 or definition with the highest confidence score 119 in accordance with knowledgebase 108. In some embodiments, prediction 124 may include multiple predictions 124 that exceed a threshold 121, and may allow or ask the user 106 to select the correct interpretation of unknown 120, or provide their own user definition 122.

In some embodiments, if the confidence score 119 is above a first threshold 121 (e.g., 80%), then CLS 102 may conclude or determine that the phrase is known and provide response 118 without requesting any additional user feedback. If the confidence 119 is below the first threshold, then CLS 102 may determine that the phrase is unknown 120. If the confidence is above a second threshold (e.g., 60%) but below the first threshold, CLS 102 may offer a prediction 124, and ask the user to confirm if the prediction(s) 124 is correct. And if the confidence 119 is below the second threshold, no prediction 124 may be offered to the user, and the user 106 may simply be asked to provide a user definition of 122 of the unknown 120 word or phrase.

If CLS 102 has generated a prediction 124, then prediction 124 may be provided as output 114 (e.g., audio or visual) and the user may be asked to confirm whether or not the prediction 124 is correct. If the prediction 124 is confirmed by the user 106, then prediction 124 may be used as user definition 122 and processing may continue as described in greater detail below. The user 106 may also be provided the option to enter their own user definition 122 if the prediction(s) 124 is inaccurate or incorrect.

If however, there is no prediction 124 or the user indicates that the prediction 124 is incorrect, CLS 102 may provide output 114 requesting a user definition 122. Then, for example, the user 106 may speak, type, or otherwise input their own definition of the unknown 120. This user input 110 may be received as user definition 122.

In some embodiments, the user definition 122 may include a number of extraneous words that are not necessarily part of the definition. For example, the query 116 may include the question "How far is WDF from me?" CLS 102, in processing query 116, may identify WDF as an unknown 120 and may respond with output 114 "What do you mean by WDF?"

And the user 106 may respond that with a user definition 122 that "WDF is shorthand for Waldorf, Germany." The words "WDF is shorthand for" may be extraneous to the actual definition of WDF as "Waldorf, Germany." In some embodiments, CLS 102 may use natural language processing (NLP) to identify and remove or pare away the extraneous words, and identify the core definition. Or, for example, in some embodiments, CLS 102 may provide the user definition 122, in whole or in part, to perform a search against knowledgebase 108 to identify the closest existing entity 132 in knowledgebase 108, or its extensions 128, that corresponds to the user definition 122.

If the confidence 119 of an identified entity 132 from knowledgebase 108 matches the user definition 122 exceeds a threshold 121, then CLS 102 may perform the query 116 with the entity 132 (in addition to or in lieu of unknown 120). If, the confidence 119 does not exceed a subsequent threshold 121, then CLS 102 may ask the user 106 for another definition 122 or further clarification.

An entity 132 may be a pre-existing entity that is or was identified in knowledgebase 108 (or one of the extensions 128), which may include one or more knowledge graphs (each of which may include various entities that have been interconnected as triples through their relationships with other entities). In continuing the example above, when the user asked for information about WDF, and provided user definition 122, a pre-existing entity 132 in knowledgebase 108 of "Waldorf (Germany)" may have been identified corresponding to the user definition 122 with confidence 119 exceeding threshold 121. Then for example, CLS 102 may map that a user terminology of WDF means or corresponds to the existing entity 132 of Waldorf (Germany).

Upon identifying entity 132 that corresponds to unknown 120 (with a sufficient confidence 119), CLS 102 may execute the query 116 against knowledgebase 108, in which entity 132 may be used in lieu of unknown 120 to generate a response 118. This response 118 may be provided to user 106 as output 114.

In some embodiments, if the user 106 responds and says "that is not correct," or provides another form of negative feedback, then the process above may repeat until an accurate entity 132 is identified and/or an accurate response 118 is generated. If there is no user response, or the user says "thanks," this may be taken by CLS 102 as positive feedback or a confirmation 126 that the entity 132 is the correct usage of unknown 120. In some embodiments, CLS 102 may implement machine learning to improve its processing based on negative and/or positive feedback from user 106.

Confirmation 126 may be any explicit or inferred feedback from user 106 that the identified entity 132 is the correct usage or interpretation of unknown 120. As noted above, the confirmation 126 may be received in the form of a cue such as "thank you", "thanks", no response for a period of time (e.g., 3 seconds), or a subsequent completely different query 116. In some embodiments, confirmation 126 may ignore negative feedback from user 106.

Once confirmation 126 has been detected by CLS 102, CLS 102 may extend knowledgebase 108 to account for the new entity 132 corresponding to user definition 122 for unknown 120, thereby customizing the utility of digital assistant 104 for user 106. In some embodiments, CLS 102 may generate or add to a user extension 128A and/or a group extension 128B which may extend the existing knowledgebase 108 to include the new terminology of unknown 120. User extension 128A and group extension 128B may referred together or separately, herein generally as extension 128.

Extension 128 may be an addition or extension to knowledgebase 108 that is customized for user 106 (in the case of user extension 128A) and/or a group of users (with group extension 128B). In some embodiments, user 106 may have access to digital assistant 104 for their own personal uses and may have their own user extension 128A for their own user-specific terminology. However, user 106 may also or alternatively, be part of a larger group of users who belong to the same organization, demographic, or class, in which case user 106 may share a group extension 128B (which may be in addition to or an alternative to user extension 128A).

When a query 116 is received, CLS 102 may check the terms of the query 116 against user extension 128A (if available), group extension 128B (if available), and then knowledgebase 108. In some embodiments, if user extension 128A includes an entry or definition for a phrase of query 116, this entry may be used in query 116 which may then be processed against knowledgebase 108 without checking group extension 128B. If there is no entry or entity 132 in user extension 128A corresponding to an identified unknown 120, then CLS 102 may check group extension 128B for an entity 132 matching unknown 120. If there is no entry or entity 132 in group extension 128B, then CLS 102 may use the definition with the highest confidence 119 from knowledgebase 108 as described above, or ask for a user definition 122. In other embodiments, group extension 128B may be checked prior to and given priority over user extension 128A.

In some embodiments, the same term or unknown 120 may appear in both user extension 128A and group extension 128B with different meanings or entries. Then, for example, in some embodiments, user extension 128A may be given priority over group extension 128B. In other embodiments, group extension 128B may be given priority over user extension 128A. In some embodiments, CLS 102 may prompt the user 106 to confirm which entity 132 or definition of unknown 120 the user 106 wants to use for query 116. This may then be saved as a default usage for unknown 120 for user 106.

In some embodiments, when adding a new entry to an extension 128, CLS 102 may generate a new triple 130. Triple 130 may be a format in which knowledgebase 108 stores and connects or correlates information for faster processing. Triple 130 may include three portions: an unknown 120, an entity 132, and a relationship 134. As noted above, unknown 120 may be a phrase or word from query 116 that could not be identified in knowledgebase 108 (or either extension 128), for which user 106 provided user definition 122 and/or confirmation 126. Entity 132 may be an existing entity or understood terminology from extension 128 and/or knowledgebase 108.

The relationship 134 may define the connection or relation between the unknown 120 and the entity 132. In the example, the relationship 134 may be interpreted as "means", such that the new triple 130 may be: WDF means Walldorf (Germany).

This new triple 130 may be added to user extension 128A. Then, for example, any subsequent queries 116 from user 106 that include the abbreviation or phrase WDF may automatically be linked, by CLS 102 and through user extension 128A, to Waldorf (Germany), and the user 106 would not need to be prompted to provide additional information or a new definition.

In an embodiment, a subsequent query 116 may include "Where is Building 5?" CLS 102 may not be able to identify "Building 5" in knowledgebase 108, and user 106 may be prompted by CLS 102 via digital assistant 104 to provide a user definition 122. User 106 may provide input 110 or user definition 122 that "Building 5 is located in WDF." Then, for example, CLS 102 may add a new triple 130 with "Building 5 located in WDF" or "Building 5 located in Waldorf (Germany)", and build off the previous extension 128 or triple 130 for WDF.

In some embodiments, when a particular user 106 provides a confirmation 126 or user definition 122 for an unknown 120, CLS 102 may add the unknown 120 to the user extension 128A. However, further verification may be required to add the unknown 120 to a group extension 128B which may be used by multiple users, including user 106. In some embodiments, the group may include members of a social club, members of team, employees of a particular company, or even residents of a particular community, city, country or other geographic area.

In some embodiments, a role of the user 106 may cause CLS 102 to add new triple 130 to both user extension 128A and group extension 128B. For example, if the role of user 106 is that of a manager, administrator, or executive in the group of users associated with the group with particular permissions which may not be available to other members of the group, then a new triple 130 added to user extension 128A may be enough for CLS 102 to add the new triple 130 to the group extension 128B. In some embodiments, there may not be a user extension 128A, and may only be a group extension 128B. In some embodiments, CLS 102 may prompt user 106 whether the unknown 120 should be added to user extension 128A, group extension 128B, both, or neither.

In some embodiments, a single user 106 adding a new word, phrase, or unknown 120 to their user extension 128A may not be enough to add the unknown 120 to the group extension 128B. In this case, a new triple 130 may be added as a provisional 138 to the group extension 128B. The provisional 138 may be a new triple 130 added by one or more members of the group that still requires further verification prior to adding the provisional 138 to the group extension 128B.

In some embodiments, whether or not provisional 138 is added to group extension may be determined based on a verification or validation count 136. Count 136 may be a count of how many different users, or how many different times, the same unknown 120 was mapped to the same entity 132.

In some embodiments, CLS 102 may monitor operations across multiple different users (not shown) for a period of time to determine whether the count 136 (of uses of unknown 120 in the context of entity 132) exceeds a threshold. For example, if another user uses the term WDF and CLS 102 may provisionally use the Waldorf (Germany) entity 132 to perform the query 116 for the other user. If CLS 102 detects positive feedback from the other user, then count 136 may be increased. In some embodiments, CLS 102 may prompt the other user to confirm whether WDF refers to Waldorf (Germany), and based on the user response, the count 136 may be incremented. In some embodiments, count 136 may also or alternatively include a negative count as well tracking a number of negative responses. Then for example, if the negative count exceeds a threshold, the provisional 138 may be rejected.

If the (positive) count 136 exceeds the threshold, then the provisional 138 may be added to the group extension 128B. If the count 136 does not exceed the threshold within a particular period of time or number of uses, the provisional 138 may be rejected or discarded from the group extension 128B, but may remain in the user extension 128A (if any).

In some embodiments, CLS 102 may directly poll or query other users to validate the new triple 130, and determine the count 136. For example, CLS 102 may prompt a subset of users from the group, whether the unknown 120 has the relationship 134 to entity 132 as indicated in provisional 138. And if enough users reply 'yes', then provisional 138 may be added to group extension 128B, or if enough users reply 'no', then provisional 138 may be rejected or discarded. In some embodiments, CLS 102 may require approval from an administrator before adding a new triple 130 to group extension 128B in addition to or in lieu of count 136.

Figure 2:
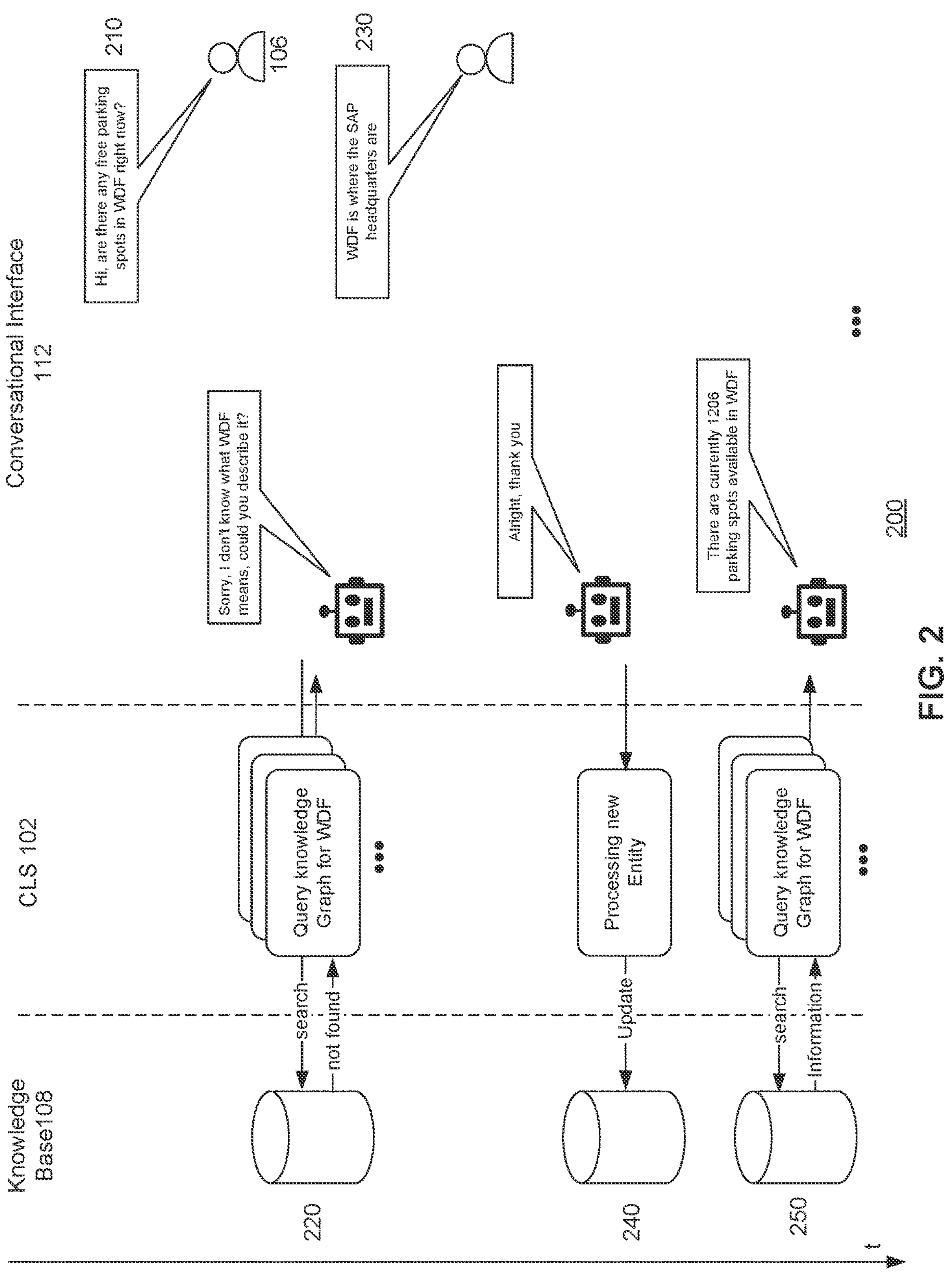
FIG. 2 is an example interaction diagram illustrating example operations of a continuous learning system (CLS), according to some example embodiments.

FIG. 2 is an example interaction diagram illustrating example operations of a continuous learning system (CLS) 102, according to some example embodiments. At 210, a user 106 may begin by submitting a query 116 by asking a question about the free parking spots in WDF. This input 110 may be provided audibly (as illustrated) or via text.

At 220, CLS 102 may convert the input 110 into a textual query 116, and search the existing knowledgebase 108, which may include a knowledge graph, for the components of or an answer to the query 116. The result or response 118 of the query 116 of knowledgebase 108 may be that the term "WDF" may not be found in the knowledgebase 108 or the knowledge graph. CLS 102 may then designate "WDF" as an unknown 120. The response 118 may be communicated to the user 106 through interface 112. However, rather than providing an error or exception, CLS 102 may request a user definition 122 of "WDF" in plain language or natural language that the user 106 may understand.

At 230, the user 106 may speak or input a definition of WDF.

At 240, CLS 102 may process the user definition 122 and compare it against knowledgebase 108 to confirm whether there is an entity 132 that corresponds to the user definition 122 provided at 230. In this case, CLS 102 may be able to identify that "SAP headquarters" is an entity 132 in knowledgebase 108, and may update or add a new triple 130 to knowledgebase 108, user extension 128A, and/or group extension 128B indicating that WDF is referring to SAP headquarters.

At 250, CLS 102 may execute the query 116 with SAP headquarters and return the response 1206 indicating there 1206 parking spots available at WDF. Also, in any subsequent query 116 including the phrase WDF, such as "What is the weather at WDF?", CLS 102 may already have an entry or triple 130 indicating that WDF is referring to SAP headquarters and may simply return the weather (as retrieved from knowledgebase 108) without asking the user 106 for another definition of WDF.

Figure 3:
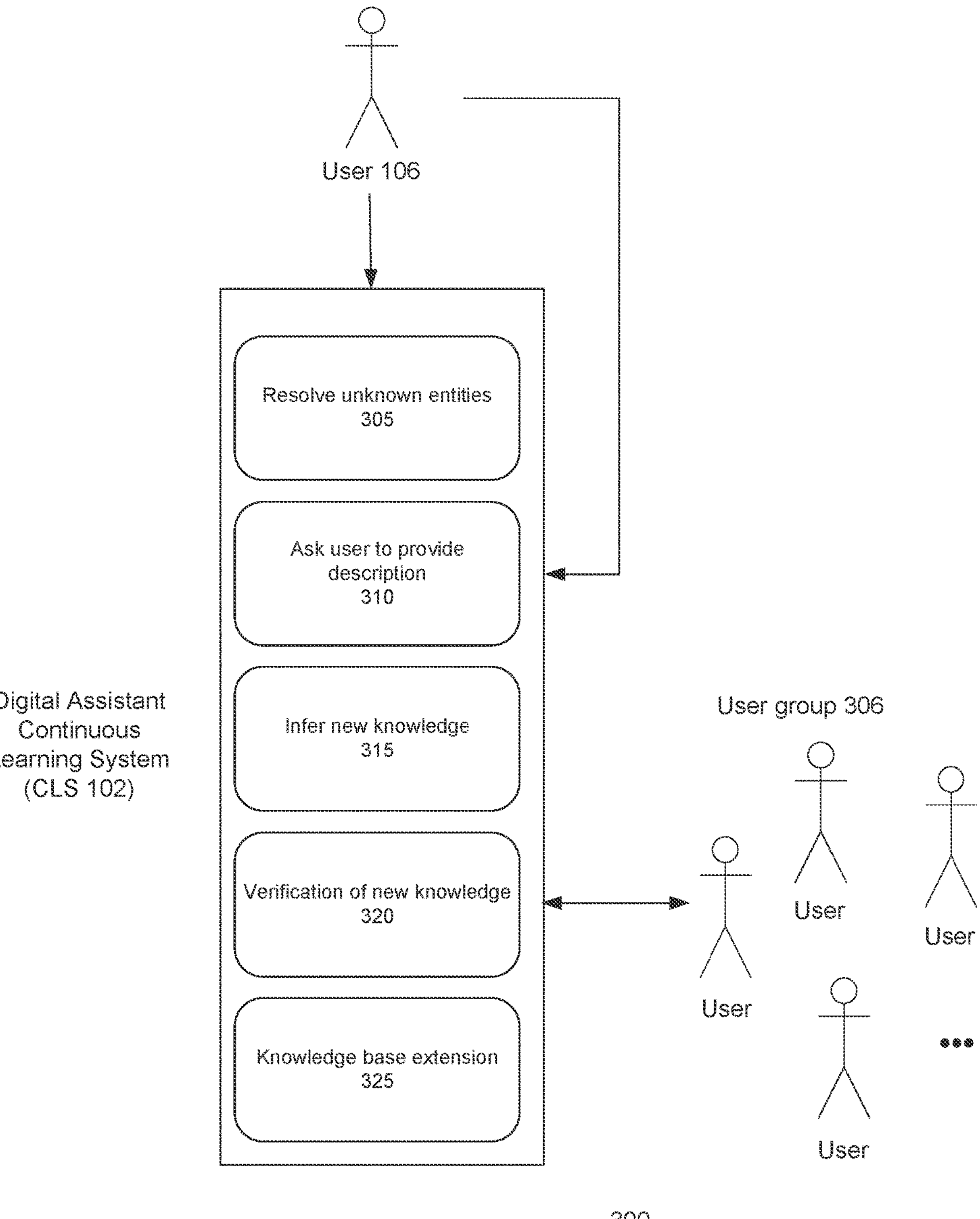
FIG. 3 is an example diagram illustrating example operations of a continuous learning system (CLS), according to some example embodiments.

FIG. 3 is an example diagram illustrating example operations of a continuous learning system (CLS) 102, according to some example embodiments. At 305, CLS 102 may have received input 110 and identified an unknown 120 that may need to be resolved to properly execute the query 116.

At 310, CLS 102 may prompt the user for an additional description or definition for the unknown 120. In some embodiments, CLS 102 may ask the user to confirm whether or not a predicted answer (that has a confidence 119 over a threshold 121) is the correct interpretation of the unknown 120. The user 106 may provide a definition or description of the unknown 120.

At 315, CLS 102 may verify that the user definition 122 corresponds to a known entity 132, and generate a response 118 to the query 116. In some embodiments, CLS 102 may generate a provisional entry 138 in group extension 128B which may require additional verification from one or more other users of a user group 306 before permanent entry into group extension 128B. In some embodiments, provisional 138 may be used as prediction 124 for subsequent queries 116 by users of user group 306 who may use the same unknown 120.

At 320, CLS 102 may verify whether or not provisional 138 should be entered based on responses or input 110 by one or more users of user group 306. User group 306 may include one or more other users who are in or administrators for group extension 128B. In some embodiments, CLS 120 may generate a poll and ask the users of user group 306 whether the provisional 138 is accurate. In some embodiments, CLS 120 may monitor the activities (e.g., input 110 and queries 116) from user group 306 to identify whether provisional 138 is used by any of the users of user group 306.

At 325, if the user group 306 has confirmed the accuracy of provisional 138, then new triple 130 may be added to group extension 128B and available to all the users of user group 306.

Figure 4:
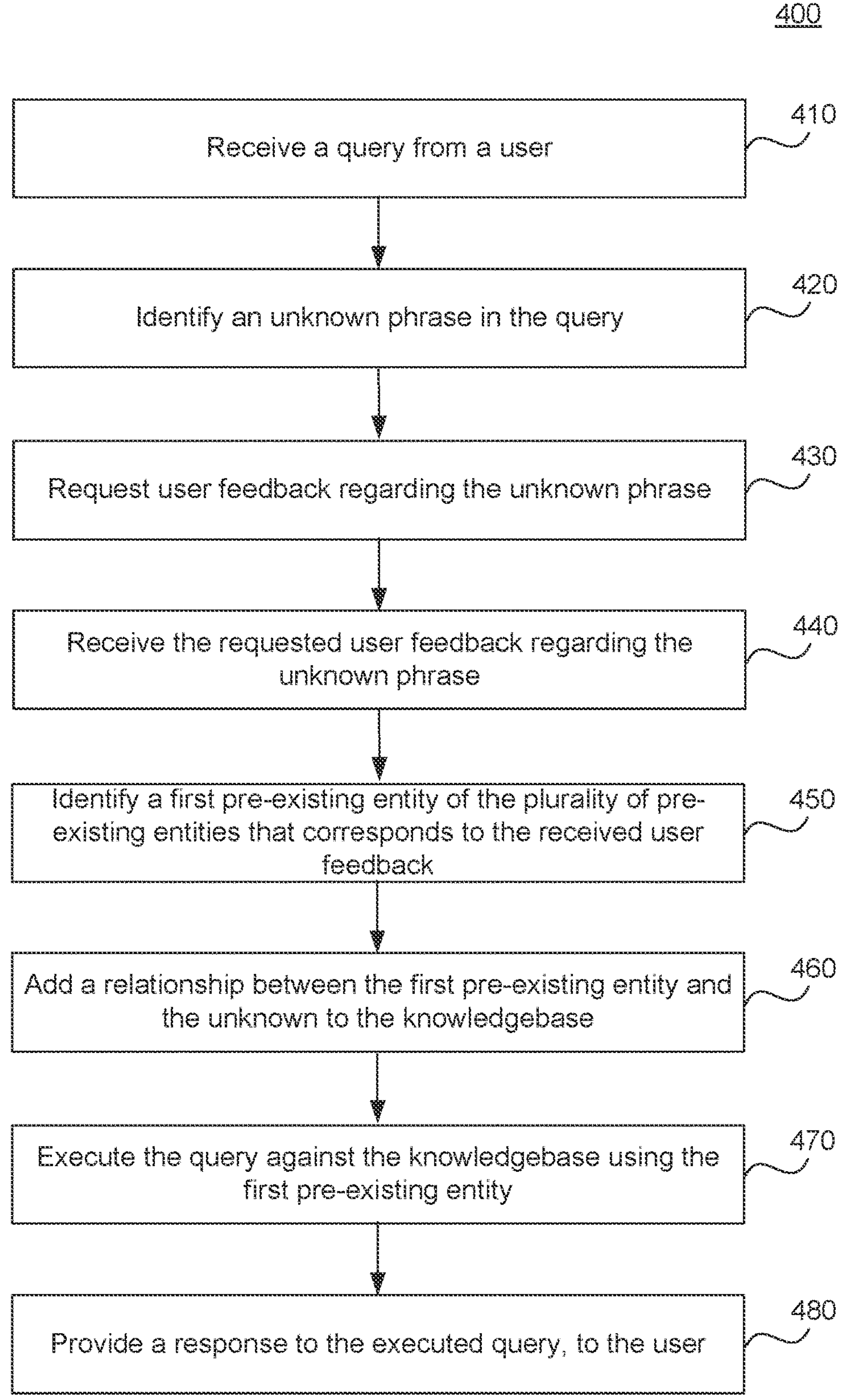
FIG. 4 is a flowchart illustrating a process for a continuous learning system (CLS), according to some embodiments.

FIG. 4 is a flowchart illustrating a process 400 for a continuous learning system (CLS) 102, according to some embodiments. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art. Method 400 shall be described with reference to the figures.

In 410, a query is received from a user. For example, CLS 102 may receive input 110 from user 106, which may be interpreted as or converted to query 116. Query 116 may be a request for information or to perform or execute a command by one or more computing devices, or a request for information.

In 420, an unknown phrase is identified in the query. For example, CLS 102 may identify that are one or more words or phrases from input 110 or query 116 that cannot be identified in an existing knowledgebase 108 and/or extension 128. These words or phrases may be marked as unknown 120 by CLS 102.

In 430, user feedback is requested regarding the unknown phrase. For example, CLS 102 may prompt or request from user 106, a user definition 122 for unknown 120 or a confirmation whether or not a prediction 124 about the unknown 120 is accurate.

In 440, the requested user feedback regarding the unknown phrase is received. For example, CLS 102 may receive user definition 122. In some embodiments, the received user definition 122 may include extraneous words that are not necessarily part of the definition such as "that word means . . . ". CLS 102 may identify and remove these extraneous words.

In 450, a first pre-existing entity of the plurality of pre-existing entities that corresponds to the received user feedback is identified. For example, CLS 102 may confirm that the user definition 122 for unknown 120 corresponds to an entity in knowledgebase 108.

In 460, a relationship between the first pre-existing entity and the unknown is added to the knowledgebase. For example, CLS 102 may generate a new triple 130 to add a mapping or relationship 134 between the identified entity 132 and the unknown 120 to user extension 128A, group extension 128B, and/or knowledgebase 108 in which the unknown 120 is identified as corresponding to the entity 132.

In 470, the query is executed against the knowledgebase using the first pre-existing entity. For example, CLS 102 may execute the query 116 with the identified entity 132 against knowledgebase 108 to generate a response 118.

In 480, a response, to the executed query, is provided to the user. For example, CLS 102 may provide response 118 to the query 116.

Figure 5:
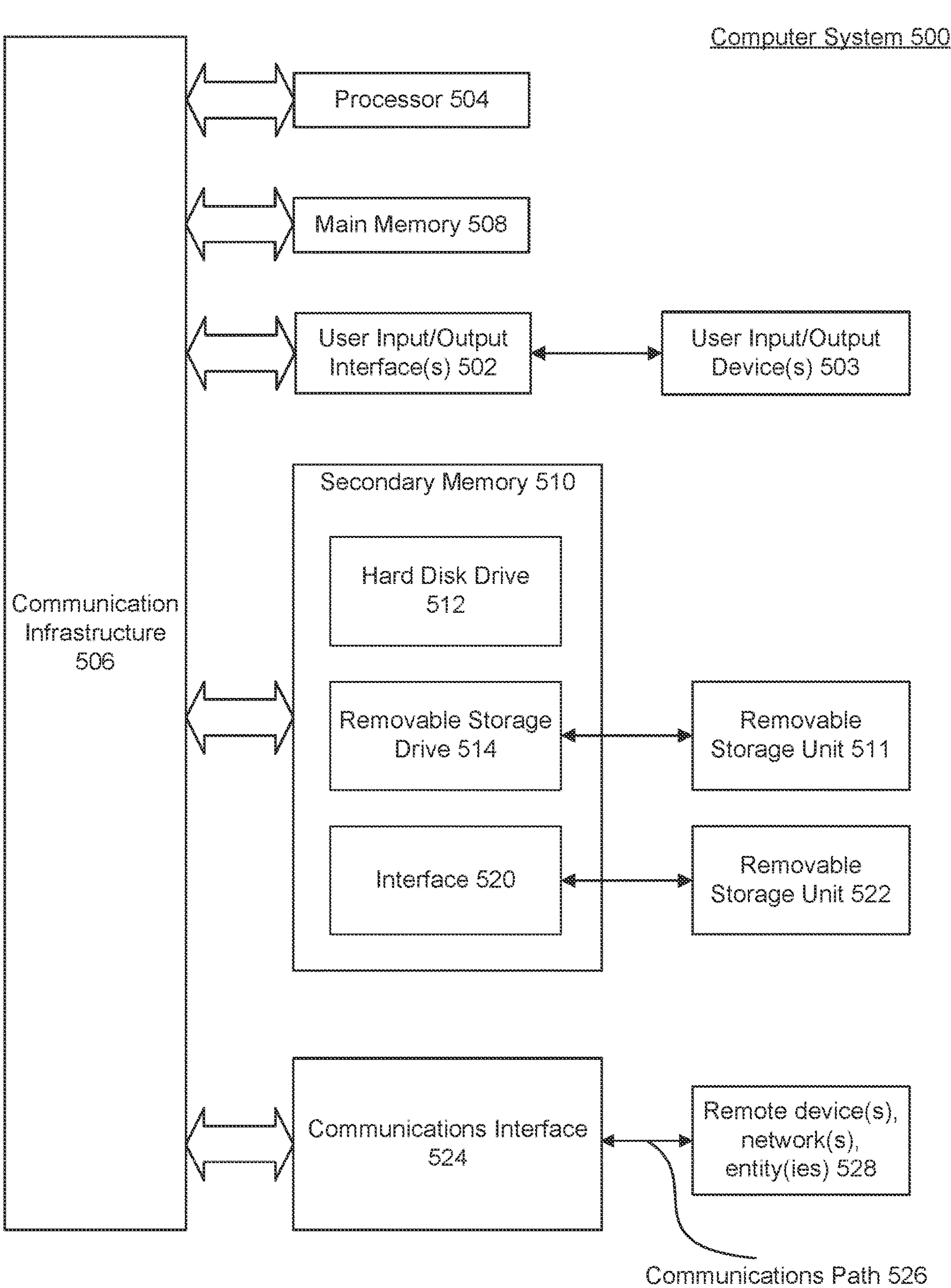
FIG. 5 illustrates an example computer system useful for implementing various embodiments.

Various embodiments and/or components therein can be implemented, for example, using one or more computer systems, such as computer system 500 shown in FIG. 5. Computer system 500 can be any computer or computing device capable of performing the functions described herein. For example, one or more computer systems 500 can be used to implement any embodiments, and/or any combination or sub-combination thereof.

Computer system 500 includes one or more processors (also called central processing units, or CPUs), such as a processor 504. Processor 504 is connected to a communication infrastructure or bus 506. Computer system 500 may represent or comprise one or more systems on chip (SOC).

One or more processors 504 can each be a graphics processing unit (GPU). In some embodiments, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 500 also includes user input/output device(s) 503, such as monitors, keyboards, pointing devices, etc., that communicate with communication infrastructure 506 through user input/output interface(s) 502.

Computer system 500 also includes a main or primary memory 508, such as random access memory (RAM). Main memory 508 can include one or more levels of cache. Main memory 508 has stored therein control logic (i.e., computer software) and/or data.

Computer system 500 can also include one or more secondary storage devices or memory 510. Secondary memory 510 can include, for example, a hard disk drive 512 and/or a removable storage device or drive 514. Removable storage drive 514 can be a floppy disk drive, a magnetic tape drive, a compact disk drive, an optical storage device, tape backup device, and/or any other storage device/drive.

Removable storage drive 514 can interact with a removable storage unit 518. Removable storage unit 518 includes a computer usable or readable storage device having stored thereon computer software (control logic) and/or data. Removable storage unit 518 can be a floppy disk, magnetic tape, compact disk, DVD, optical storage disk, memory card, and/any other computer data storage device. Removable storage drive 514 reads from and/or writes to removable storage unit 518 in a well-known manner.

According to an exemplary embodiment, secondary memory 510 can include other means, instrumentalities or other approaches for allowing computer programs and/or other instructions and/or data to be accessed by computer system 500. Such means, instrumentalities or other approaches can include, for example, a removable storage unit 522 and an interface 520. Examples of the removable storage unit 522 and the interface 520 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 can further include a communication or network interface 524. Communication interface 524 enables computer system 500 to communicate and interact with any combination of remote devices, remote networks, remote entities, etc. (individually and collectively referenced by reference number 528). For example, communication interface 524 can allow computer system 500 to communicate with remote devices 528 over communications path 526, which can be wired and/or wireless, and which can include any combination of LANs, WANs, the Internet, etc. Control logic and/or data can be transmitted to and from computer system 500 via communication path 526.

In some embodiments, a tangible apparatus or article of manufacture comprising a tangible computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not the Summary and Abstract sections, is intended to be used to interpret the claims. The Summary and Abstract sections can set forth one or more but not all exemplary embodiments as contemplated by the inventors, and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method comprising:
receiving a query from a user;
identifying an unknown phrase in the query, wherein the unknown phrase does not exist in a knowledgebase comprising a plurality of pre-existing entities;
requesting, by one or more processors, feedback from the user regarding the unknown phrase;
receiving, by the one or more processors, the feedback regarding the unknown phrase;
parsing, by a natural language model, the feedback regarding the unknown phrase to identify non-extraneous words that define the unknown phrase;
identifying, by the one or more processors, a relationship between a first pre-existing entity of the plurality of pre-existing entities and the unknown phrase based on the non-extraneous words, wherein the relationship defines the unknown phrase;
requesting, by the one or more processors, confirmation that the relationship between the first pre-existing entity and the unknown phrase is accurate based on additional user feedback from a set of users, wherein the set of users are in a same group-specific knowledgebase extension as the user;
receiving, by the one or more processors, the requested confirmation from the set of users that the relationship between the first pre-existing entity and the unknown phrase is accurate;
adding, by the one or more processors, the relationship between the first pre-existing entity and the unknown phrase to the knowledgebase based on the confirmation;
executing, by the one or more processors, the query against the knowledgebase using the first pre-existing entity; and
providing, by the one or more processors, a response, to the executed query, to the user.

2. The method of claim 1, wherein the query is an audible query spoken by the user.

3. The method of claim 1, further comprising:
requesting a confirmation that the unknown phrase corresponds to a first pre-existing phrase; and
receiving the confirmation prior to the executing the query.

4. The method of claim 3, wherein the adding comprises:
identifying a user-specific knowledgebase extension; and
adding a triple comprising a relationship between the unknown phrase and the first pre-existing entity to the user-specific knowledgebase extension.

5. The method of claim 4, further comprising:
receiving a subsequent query including the unknown phrase; and
identifying the first pre-existing entity from the user-specific knowledgebase extension; and
executing the subsequent query against the knowledgebase using the first pre-existing entity.

6. The method of claim 1, wherein the adding comprises:
identifying a user-specific knowledgebase extension and the group-specific knowledgebase extension, wherein the user-specific knowledgebase extension corresponds to the user, and wherein the group-specific knowledgebase extension corresponds to a plurality of users including the user; and
adding a triple comprising a relationship between the unknown phrase and the first pre-existing entity to the user-specific knowledgebase extension, wherein the group-specific knowledgebase extension does not include the triple.

7. The method of claim 6, wherein the group-specific knowledgebase extension includes a relationship between the unknown phrase and a second pre-existing entity of the plurality of pre-existing entities, different from the first pre-existing entity.

8. The method of claim 1, wherein the adding comprises:
updating a count of a number of times the first pre-existing entity has been determined to correspond to the unknown phrase, wherein the count is across a plurality of users of a first group;
determining that the updated count exceeds a threshold;
identifying a first group-specific knowledgebase extension associated with the first group; and
adding a triple comprising a relationship between the unknown phrase and the first pre-existing entity to the first group-specific knowledgebase extension, wherein a second group-specific knowledgebase extension remains unchanged.

9. A system comprising at least one processor, the at least one processor configured to perform operations comprising:
receiving a query from a user;
identifying an unknown phrase in the query, wherein the unknown phrase does not exist in a knowledgebase comprising a plurality of pre-existing entities;
requesting feedback from the user regarding the unknown phrase;
receiving the feedback regarding the unknown phrase;
parsing, by a natural language model, the feedback regarding the unknown phrase to identify non-extraneous words that define the unknown phrase;
identifying a relationship between a first pre-existing entity of the plurality of pre-existing entities and the unknown phrase based on the non-extraneous words, wherein the relationship defines the unknown phrase;
requesting confirmation that the relationship between the first pre-existing entity and the unknown phrase is accurate based on additional user feedback from a set of users, wherein the set of users are in a same group-specific knowledgebase extension as the user;
receiving the requested confirmation from the set of users that the relationship between the first pre-existing entity and the unknown phrase is accurate;
adding the relationship between the first pre-existing entity and the unknown phrase to the knowledgebase based on the confirmation;

executing the query against the knowledgebase using the first pre-existing entity; and providing a response, to the executed query, to the user.

10. The system of claim 9, wherein the query is an audible query spoken by the user.

11. The system of claim 9, the operations further comprising:

requesting a confirmation that the unknown phrase corresponds to a first pre-existing phrase; and receiving the confirmation prior to the executing the query.

12. The system of claim 11, wherein the adding comprises:

identifying a user-specific knowledgebase extension; and adding a triple comprising a relationship between the unknown phrase and the first pre-existing entity to the user-specific knowledgebase extension.

13. The system of claim 12, the operations further comprising:

receiving a subsequent query including the unknown phrase; and identifying the first pre-existing entity from the user-specific knowledgebase extension; and executing the subsequent query against the knowledgebase using the first pre-existing entity.

14. The system of claim 9, wherein the adding comprises:

identifying a user-specific knowledgebase extension and the group-specific knowledgebase extension, wherein the user-specific knowledgebase extension corresponds to the user, and wherein the group-specific knowledgebase extension corresponds to a plurality of users including the user; and adding a triple comprising a relationship between the unknown phrase and the first pre-existing entity to the user-specific knowledgebase extension, wherein the group-specific knowledgebase extension does not include the triple.

15. The system of claim 14, wherein the group-specific knowledgebase extension includes a relationship between the unknown phrase and a second pre-existing entity of the plurality of pre-existing entities, different from the first pre-existing entity.

16. The system of claim 9, wherein the adding comprises:

updating a count of a number of times the first pre-existing entity has been determined to correspond to the unknown phrase, wherein the count is across a plurality of users of a first group;

determining that the updated count exceeds a threshold;

identifying a first group-specific knowledgebase extension associated with the first group; and adding a triple comprising a relationship between the unknown phrase, the first pre-existing entity to the first group-specific knowledgebase extension, wherein a second group-specific knowledgebase extension remains unchanged.

17. A non-transitory computer-readable medium having instructions stored thereon that, when executed by at least one computing device, cause the at least one computing device to perform operations comprising:

receiving a query from a user;

identifying an unknown phrase in the query, wherein the unknown phrase does not exist in a knowledgebase comprising a plurality of pre-existing entities;

requesting feedback from the user regarding the unknown phrase;

receiving the feedback regarding the unknown phrase;

parsing, by a natural language model, the feedback regarding the unknown phrase to identify non-extraneous words that define the unknown phrase;

identifying a relationship between a first pre-existing entity of the plurality of pre-existing entities and the unknown phrase based on the non-extraneous words, wherein the relationship defines the unknown phrase;

requesting confirmation that the relationship between the first pre-existing entity and the unknown phrase is accurate based on additional user feedback from a set of users, wherein the set of users are in a same group-specific knowledgebase extension as the user;

receiving the requested confirmation from the set of users that the relationship between the first pre-existing entity and the unknown phrase is accurate;

adding the relationship between the first pre-existing entity and the unknown phrase to the knowledgebase based on the confirmation;

executing the query against the knowledgebase using the first pre-existing entity; and providing a response, to the executed query, to the user.

18. The non-transitory computer-readable medium of claim 17, wherein the query is an audible query spoken by the user.

19. The non-transitory computer-readable medium of claim 17, the operations further comprising:

requesting a confirmation that the unknown phrase corresponds to a first pre-existing phrase; and receiving the confirmation prior to the executing the query.

20. The non-transitory computer-readable medium of claim 19, wherein the adding comprises:

identifying a user-specific knowledgebase extension; and adding a triple comprising a relationship between the unknown phrase and the first pre-existing entity to the user-specific knowledgebase extension.

* * * * *